United States Patent Office 3,219,721
Patented Nov. 23, 1965

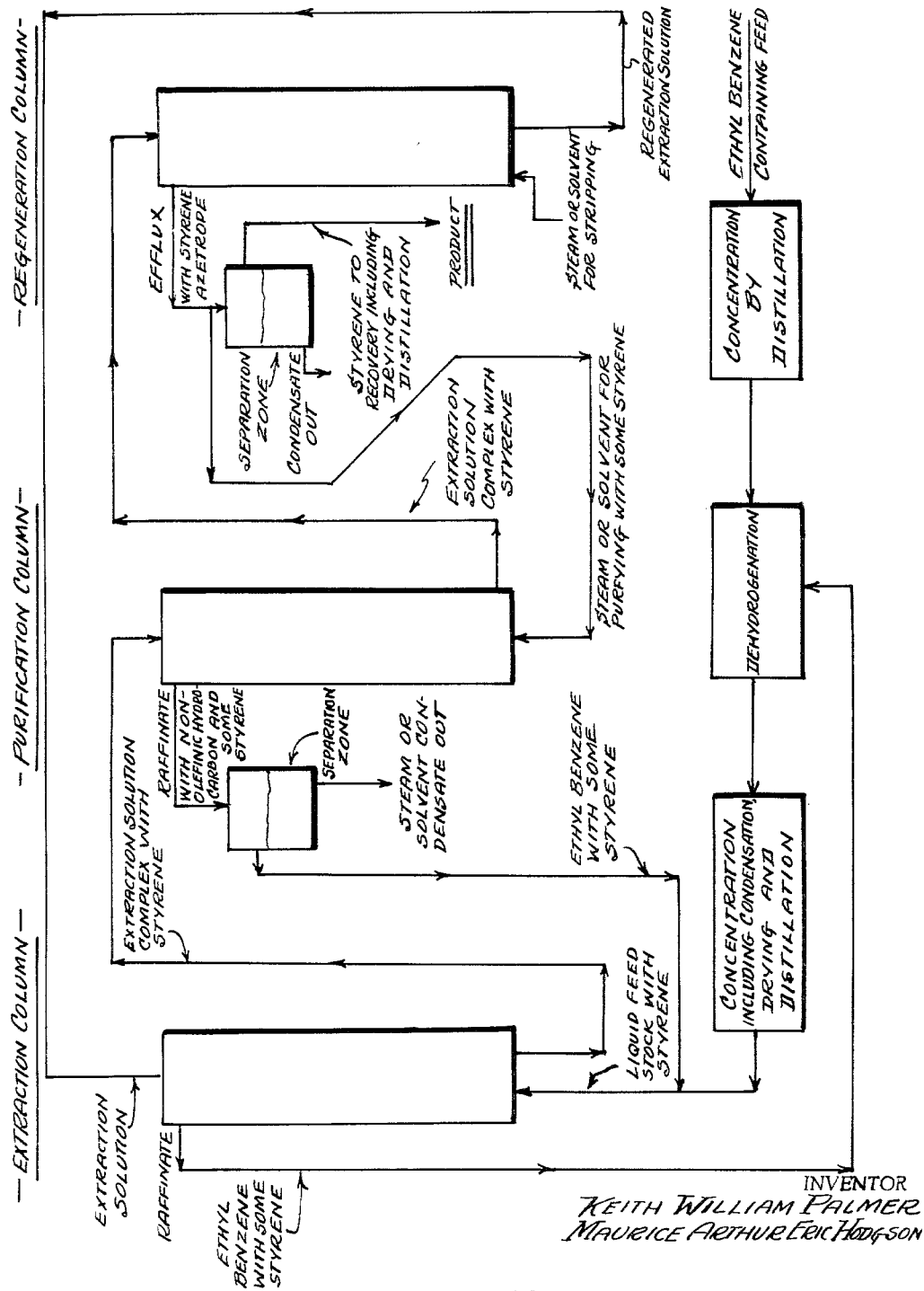

3,219,721
PROCESSES FOR THE SEPARATION OF
HYDROCARBONS
Keith William Palmer and Maurice Arthur Eric Hodgson,
Norton-on-Tees, England, assignors to Imperial Chemical Industries Limited, Millbank, London, England, a corporation of Great Britain
Filed Aug. 3, 1962, Ser. No. 214,509
Claims priority, application Great Britain, Aug. 4, 1961,
28,378/61
6 Claims. (Cl. 260—669)

The present invention relates to the separation of styrene from non-olefinic hydrocarbons, particularly alkyl substituted hydrocarbons such as xylenes.

It is frequently necessary to separate styrene from other hydrocarbons which are non-olefinic, and for this purpose distillation may not be suitable owing for example, to the tendency of styrene to polymerise, or to the close boiling characteristics of the other hydrocarbons. The present invention provides a process by means of which styrene may be readily separated from other hydrocarbons which are non-olefinic by absorbing it in a solution of a salt of a heavy metal capable of forming therewith a complex from which the styrene may be later released and the salt regenerated.

The heavy metal salt solution is preferably an aqueous solution. More particularly the salt is preferably of copper or silver, because styrene complexes of such salts are readily decomposed by simple heat treatment to recover the styrene and regenerate the salt for further use. Silver fluoborate and silver fluosilicate, separately or mixed, are particularly preferred because they are highly soluble in water and thus can be used in concentrated aqueous solutions which are therefore capable of absorbing large quantities of styrene. These salts are also capable of absorbing a high proportion of styrene per unit weight of silver.

The process may be applied in a simple cyclic arrangement of alternate absorption and regeneration phases in which styrene is dissolved from the hydrocarbon mixture and then recovered from solution. Absorption may be carried out continuously by using two batches of solution, operated on alternate phases, or by circulating the solution between absorption and regeneration zones.

The extraction of styrene may be carried out in a packed column in which the feedstock contacts the extraction solution on a counter-current stream. Particularly efficient extraction and recovery of the styrene may be obtained by multistage operation in which the feedstock successively encounters a stream of extraction solution at a series of extraction stages with settling/separation zones between them in which the feed and extraction solution separate, the lower layer of extraction solution passing to the previous extraction stage and the upper feed layer passing to the next extraction stage. The extraction solution from the first extraction stage is treated, for example by heating, to recover substantially pure styrene and regenerate the extracting solution.

The invention is particularly suitable for use in separating styrene from non-olefinic hydrocarbons containing ethyl benzene, from which it is usually prepared. Accordingly, the process of the present invention preferably includes a preliminary dehydrogenation step for dehydrogenating ethyl benzene to styrene, which is then extracted from the remaining non-olefinic hydrocarbons, including any unconverted ethyl benzene. The ethyl benzene from which the styrene is made may be relatively pure, or it may be associated with other non-olefinic hydrocarbons, particularly xylenes. Ethyl benzene is usually found in C8 fractions obtained from aromatisation processes, and the present invention enables styrene to be readily obtained from this source. The ethyl benzene may first be concentrated, for example by distillation, before it is treated in the dehydrogenation step. The crude styrene obtained after dehydrogenation may also be concentrated before it is extracted.

Styrene may be readily obtained, in accordance with this invention, in sufficiently pure form to be suitable for use in polymerisation processes, by the provision of a purification step by means of which the styrene complex is obtained substantially free from remaining non-olefinic hydrocarbons before it is decomposed. This purification step is preferably combined with the extraction and decomposition steps in a process comprising extraction, purification and regeneration stages constituted by packed columns of suitable plate value through which the extracting solution flows in turn and is then recycled. The styrene-containing liquid feed is passed up the first extracting column, counter-current to the extracting solution and the complex with styrene is carried in the extracting solution, into the purification and regeneration columns in turn. A raffinate containing the non-olefinic component of the feed, for example ethyl benzene, is recovered from the top of the first column together with a little styrene, the amount of styrene depending on such factors as the number of theoretical plates of the extracting column, flow rates, temperature, concentration and olefine content, if any, of the recycled extracting solution. This raffinate may be reprocessed by further dehydrogenation.

The extracting solution carrying the complex with styrene also meets counter-current purifying and decomposition streams in the purification and regeneration columns. These streams preferably comprise steam or an immiscible organic solvent, preferably passed through these two columns in turn, first through the regeneration column for decomposing the complex and regenerating the extracting solution. Part of the efflux from the regeneration column, containing styrene, is then passed up the purification column where it encounters the complex and removes residual non-olefinic hydrocarbons by phase transfer as a raffinate collected at the top of the purification column.

The remainder of the efflux from the top of the regeneration column is recovered to obtain the styrene product, which may be further treated, for example dried and distilled to remove solvent and small quantities of polymer and benzaldehyde which may be present.

The raffinate from the top of the second, purification column, containing chiefly non-olefinic hydrocarbons, may be separated from the steam or solvent stream and returned to the base of the extraction column to extract remnants of styrene therefrom.

Where water is lost from the extracting solution in the above described system, water or steam make up should be provided. Since low pressure process steam is however preferred for minimising styrene polymerisation by maintaining relatively low temperatures in the system, the quantity of steam necessary to supply the requisite sensible heat in the regeneration and purification columns may dilute the extracting solution, which should therefore be concentrated where necessary before recycling.

It will be understood that, instead of three separate columns, the process according to the invention may be carried out in various combinations of columns, and in particular the purification and stripping columns may be two successive sections of a single column.

The operating pressures of the steps in the process may be alike or different, and may be at atmospheric or other pressure. For example, a volatile solvent such as butane may be used in the stripping step under liquefying pressure and, after separation from the raffinate, supplied as a vapour to the purification step under a lower pressure, for removing residual non-olefinic hydrocarbons from the aqueous extract.

It may be found necessary, in the preliminary dehydrogenation step, to use diluent such as steam as is customary in dehydrogenation processes for producing styrene from ethyl benzene. The invention is illustrated by the accompanying drawing and by the following examples.

*Example 1*

A stream of ethyl benzene which was more than 99% pure was dehydrogenated in a first step to styrene by vapourising and preheating it to 675° C., mixing it with 2½ times its weight of steam at about 675° C. and passing the mixture over a conventional dehydrogenation catalyst maintained at 646° C. and containing iron, chromium and potassium. The effluent from the reaction was condensed, and the organic liquid separated from the condensate, dried and distilled to remove benzene and toluene. The product contained about 45% by weight of styrene, the remainder consisting chiefly of ethyl benzene.

The product from the first step was then submitted to treatment in the second step of the process, comprising three columns, each of 10 plates, through which a 70% by weight aqueous solution of silver fluoborate at 23° C. was circulated. The product from the first step was passed up the first, extraction column countercurrent to the silver solution in the proportion thereto of 1:4 by volume. The organic liquid collected from the top of the first column, which is the raffinate containing ethyl benzene, may be returned to the dehydrogenation stage. Steam at 70° C. and 210 mm. Hg pressure absolute was passed up the third stripping column in the proportion, measured as water, of about 0.65:1 by volume of the silver solution. Part of the vapour leaving the top of the third column and containing styrene product as azeotrope was condensed, to recover the styrene which was decanted off the steam condensate, and the remainder of the vapor was passed up the second, purification column. The styrene was recovered in 75% yield per pass at more than 99% purity, and was distilled to remove benzaldehyde and polymer.

The vapour from the top of the second column was also condensed, and the organic layer, consisting chiefly of ethyl benzene with a little styrene, was decanted and returned to the base of the first column.

*Example 2*

A C8 aromatics fraction containing by weight 21.0% of ethyl benzene, 21.1% of orthoxylene, 40.3% of metaxylene and 17.5% of paraxylene was preheated, mixed with steam and dehydrogenated in the manner described in Example 1, at a temperature of 640° C. The organic product was recovered as described and contained by weight 10.9% styrene, 9.8% ethyl benzene, 22.0% orthoxylene, 40.5% metaxylene and 16.8% paraxylene. The product was then extracted as previously described, using a feed volume ratio of 1:1 relative to the silver solution, to obtain styrene of substantially the same purity and yield per pass as in Example 1.

*Example 3*

A C8 aromatics fraction was enriched by distillation to a fraction containing, by weight, 49.0% of ethyl benzene, 13.8% orthoxylene, 25.6% metaxylene and 11.6% paraxylene. This was treated as described in Example 2. The dehydrogenation was carried out at 623° C. and the analysis of the product therefrom was 20.5% styrene, 28.0% ethyl benzene, 14.3% orthoxylene, 25.9 % metaxylene and 11.3% paraxylene. This was extracted in a second step as before, using a feed volume ratio of 1.5:1 relative to the silver solution, and gave a styrene product of substantially the same purity and yield per pass.

We claim:
1. A process for the separation of styrene from a fraction containing styrene and non-olefinic aromatic hydrocarbons from which it is difficult to separate styrene by distillation which comprises treating the fraction with an aqueous extraction solution of a silver salt in extraction, purification and regeneration stages constituted by packed columns in series, comprising the steps of passing the aqueous extraction solution of the silver salt down through the extraction column, passing a supply of styrene containing feed up the extraction column to form a styrene-silver salt complex, recovering a raffinate comprising non-olefinic hydrocarbons at the top of the extraction column, passing the styrene-silver salt complex through the purification and regeneration columns in turn, passing a regenerating fluid selected from the group consisting of steam and organic solvents which are immiscible with the aqueous solution through the regeneration and purification columns in turn, recovering styrene and regenerating fluid at the top of the regenerating column, and raffinate comprising residual non-olefinic hydrocarbons at the top of the purification column by effecting purification of the complex in the purification column as a result of phase transfer of the said residual non-olefinic hydrocarbons from the extraction solution to the regenerating fluid.

2. A process according to claim 1 in which the aqueous solution of a silver salt contains a salt selected from the group consisting of silver fluoborate and silver fluosilicate.

3. A process according to claim 1 in which the said regenerating fluid comprises steam at reduced pressure for minimizing styrene polymerization.

4. A process according to claim 1 in which at least sufficient steam is added to the system to make good losses by evaporation.

5. A process according to claim 1 in which the styrene is separated from ethyl benzene.

6. A process according to claim 5 in which the ethyl benzene comprises part of a xylene fraction.

References Cited by the Examiner
UNITED STATES PATENTS

| | | | |
|---|---|---|---|
| 2,377,221 | 5/1945 | Francis et al. | 260—669 |
| 2,391,404 | 12/1945 | Friedman et al. | 260—669 |
| 2,458,067 | 1/1949 | Friedman et al. | 260—669 |
| 3,043,893 | 7/1962 | Schaeffer et al. | 260—669 |

DELBERT E. GANTZ, *Primary Examiner.*

ALPHONZO D. SULLIVAN, *Examiner.*